United States Patent [19]

Crocket

[11] 4,058,006
[45] Nov. 15, 1977

[54] METERING DEVICE

[76] Inventor: James H. Crocket, 1442 N. Fruit Ave., Fresno, Calif. 93728

[21] Appl. No.: 618,765

[22] Filed: Oct. 2, 1975

[51] Int. Cl.² .......................................... G01M 15/00
[52] U.S. Cl. .................................................... 73/113
[58] Field of Search ............. 73/113, 149, 426, 194 R, 73/194 E; 58/146, 144; 35/51, 49

[56]  References Cited

U.S. PATENT DOCUMENTS

| | | | |
|---|---|---|---|
| 2,048,445 | 7/1936 | Green | 73/113 |
| 2,122,351 | 6/1938 | Morris | 58/144 |
| 2,271,144 | 1/1942 | McKay | 73/113 |
| 2,955,464 | 10/1960 | Elwell | 73/113 |
| 3,125,849 | 3/1964 | Wachtel | 58/144 |
| 3,423,998 | 1/1969 | Blomgren | 73/113 |

Primary Examiner—James J. Gill
Assistant Examiner—Anthony V. Ciarlante
Attorney, Agent, or Firm—Huebner & Worrel

[57]  ABSTRACT

A metering device having a housing with a successively return bent fluid receiving passage therein, having a discharge end and an inlet end, being of substantially constant capacity sufficiently restricted to generate fluid movement by capillary attraction upon the application of fluid movement from the discharge end thereof; a transparent plate mounted on the housing in fluid-tight covering relation to the passage; a coupling borne by the plate in communication with the discharge end of the passage for connection to a fluid consuming means in fluid transferring relation; and a scale borne by the plate against which fluid received in the passage can be read to reveal the time required to consume the fluid.

7 Claims, 5 Drawing Figures

METERING DEVICE

BACKGROUND OF THE INVENTION

1. Field of the Invention

The present invention relates to a metering device and more particularly to such a metering device which is adapted to serve both as a receptacle for fluid to be metered and as a timing device for determination of the time required to meter the fluid therefrom, the device having particular utility for use in model aircraft employed in competition wherein it is important precisely to control the time of engine operation while reducing to an absolute minimum the total weight of the aircraft.

2. Description of the Prior Art

There are a variety of circumstances in which it is important to meter minute quantities of fluid and to be able to determine with precision at any given moment how much time will be required to meter the fluid remaining to be metered. In hospitals, for example, it is often important to dispense minute quantities of medication into fluids which are fed intravenously to a patient. In these circumstances not only the time but the quantity of the fluid metered is important in caring for the patient. Heretofore, gravity feed devices or syringes have been employed for this purpose. Such devices are notoriously cumbersome, imprecise and subject to failure.

Another quite different environment in which the metering of minute quantities of fluid is required is in model aircraft which utilize small bore engines. In certain types of competition, the length of time that the model aircraft remains airborne after a given period of engine operation is used in determining the winner. In such competition, engine operation beyond the prescribed time period disqualifies the competitor while engine operation short of the time period severely handicaps the competitor. Thus, in this type of competition as well as in all model aircraft operation, it is important to control the precise time of engine operation. Prior art devices employed in model aircraft to provide this control primarily related to mechanical timing devices which shut off the supply of fuel to the engine upon the passage of the selected time interval. Such devices are imprecise, subject to breakdown and of a weight which detracts from the flight characteristics of the aircraft.

Therefore, it has long been known that it would be desirable to have a metering device which permits the dependably precise metering of minute quantities of fluid therefrom, which is not dependent upon gravity feed, external pressure, or mechanical operation and which is of minimal weight providing an unparalleled dependability of operation throughout a long operational life.

SUMMARY OF THE INVENTION

It is therefore an object of the present invention to provide an improved metering device.

Another object is to provide such a device which can be employed to meter fluids in minute quantities in a wide variety of areas of application Another object is to provide such a device which can be employed as both a container and a timer for fluids to be metered.

Another object is to provide such a device which meters fluid without being dependent upon gravity feed, external pressure or mechanical operation.

Another object is to provide such a metering device which employs the fluid itself to register the time required for the metering operation.

Another object is to provide such a device which has particular utility in model aircraft competition precisely to control the length of time of engine operation serving both as a fuel tank and a timer.

Another object is to provide such a metering device which eliminates the necessity for the use of mechanical timing devices aboard model aircraft used in competition.

Another object is to provide such a metering device which can be employed in model aircraft to provide a sufficient reserve for warming up and tuning of the engine thereafter permitting precise control of the time of engine operation.

Another object is to provide such a metering device which is not subject to attack by nitro-methane fuels and other corrosive fluids.

A further object is to provide such a device which is of extremely light weight and compact size.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
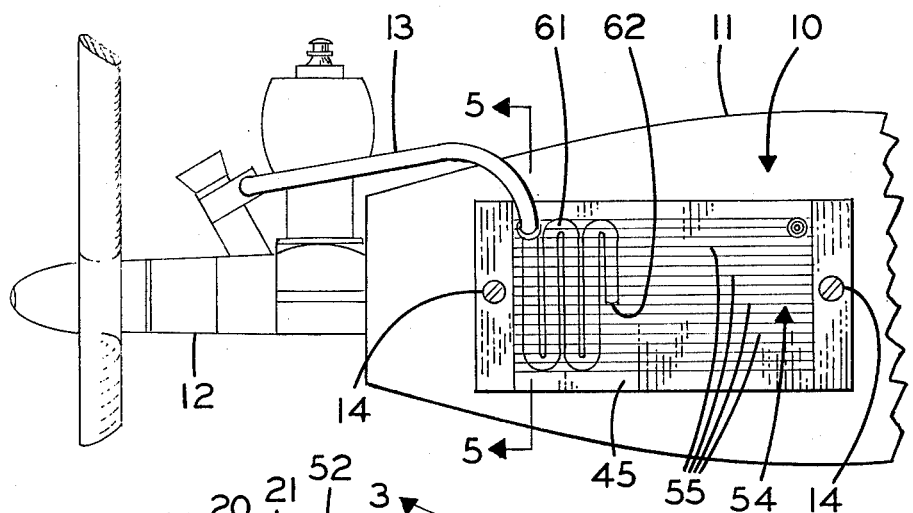
FIG. 1 is a front elevation of the metering device of the present invention shown in a representative operative environment mounted on a model aircraft which is fragmentarily represented.

Referring more particularly to the drawing, the metering device of the present invention is generally indicated by the numeral 10. As shown in FIG. 1, the metering device is mounted on a model aircraft fuselage 11. A small displacement model aircraft engine 12 is mounted on the fuselage as directed by conventional practice. A fuel line 13 operably interconnects the engine and the metering device as will hereinafter be set forth. The metering device is mounted on the fuselage as by a pair of screws 14.

The metering device 10 has a container or housing 20 which is preferably constructed of a suitable plastic material, such as Delrin, because of the ease with which such materials can be used in manufacturing within prescribed tolerances and because of their light weight and minimal expense. However, the housing may also be constructed of a variety of other materials, depending upon its intended use, such as aluminum, titanium, magnesium and the like.

Figure 4:
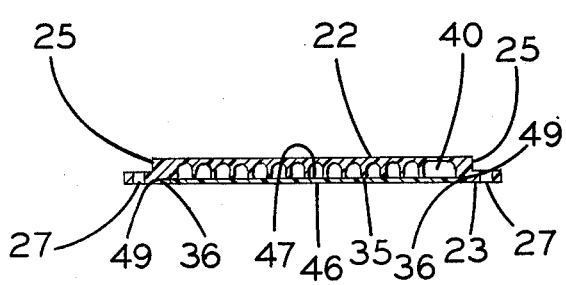
FIG. 4 is a longitudinal section taken from a position indicated by line 4—4 in FIG. 3.
Figure 5:
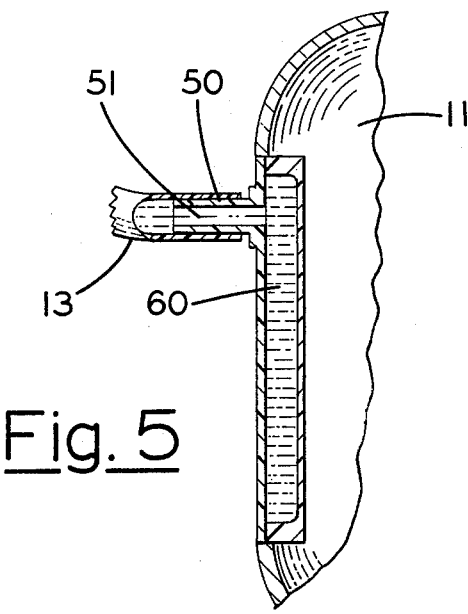
FIG. 5 is a fragmentary transverse section taken on line 5—5 in FIG. 1.

The housing 20 has a substantially rectangular block portion 21 having a substantially flat back side 22 and front side 23. The block portion has opposite side edges 24 and opposite end edges 25. The block portion integrally mounts a pair of opposite mounting flanges 26 extending from the opposite end edges and preferable offset with respect to the back side 22, as best shown in FIG. 4. The mounting flanges are disposed in coplanar relation. Each of the mounting flanges has a screw hole 27 extended therethrough.

Figure 3:
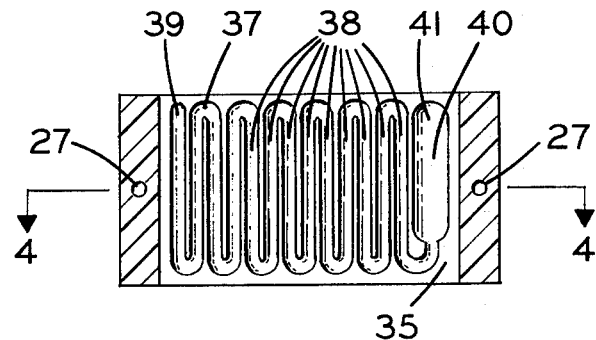
FIG. 3 is a longitudinal section taken on line 3—3 in FIG. 2.

The housing 20 has a recess 35 in the front side 23 of the block portion 21 disposed between the mounting flanges 26 so as to define and be bounded by opposite edges 36 of the flanges. The recess possesses predetermined dimensions, as will hereinafter be described. A return bent reservoir or passage 37 is formed in the block portion 21 of the housing 20 disposed in a substantially common plane communicating with the recess 35 of the block portion. The passage is successively return bent to form substantially parallel sections 38 therefor, as best shown in FIG. 3. The passages are of a substantially common, relatively narrow width. The specific width is dependent upon the requirements of the particular use for which the metering device is to be employed. In the operative environment shown in FIG. 1, the width of the passage should preferably be approximately equal to the internal diameter of the fuel line 13. For example, where the engine 12 has a cylinder bore in the range of from approximately 0.020 to approximately 0.049 inches in diameter, the width of the passage should preferably be approximately three thirty-seconds of an inch.

The passage 37 has a discharge end 39 adjacent to the opposite end edge 25 of the block portion 21 on the left as viewed in FIG. 3. The housing has a chamber 40 in communication with the passage remote from the discharge end thereof and adjacent to the opposite end edge 25 on the right as viewed in FIG. 3. The chamber may be of any suitable size consistent with the use to which the metering device 10 is to be directed. The chamber has an inlet end 41.

Figure 2:
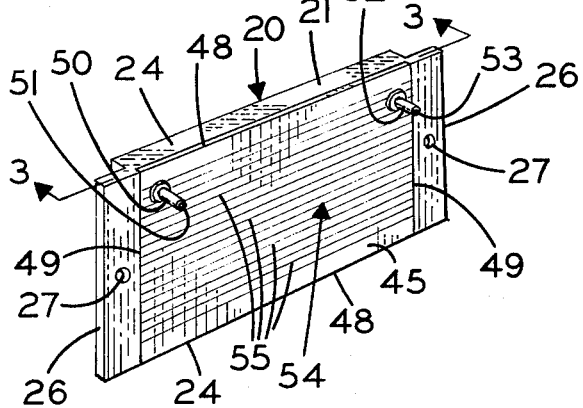
FIG. 2 is a perspective view of the metering device.

The metering device 10 has a substantially flat cover plate 45, having a front face 46 and a substantially parallel rear face 47. The cover plate is substantially rectangular and has a pair of parallel side edges 48 and right-angularly related parallel end edges 49. The cover plate is preferably constructed of a transparent material, such as Delrin or high density polypropylene plastic. The cover plate is dimensioned to fit snugly within the recess 35 of the housing 20 in fluid sealing relation to the passage 37 and chamber 40, as best shown in FIGS. 2 and 4. The cover plate can be mounted in the described position by any suitable means such as through the use of a suitable adhesive, by the use of rivets, not shown, by electronic sound welding, or by simply being press fit into position. Where adhesives are used, attention must be directed to the use of adhesives that will not be dissolved or broken down by the fluid to be contained within the passage. Thus, for example, in the operative environment shown in FIG. 1, where nitro-methane fuel is the fluid to be used, such fuel attacks certain epoxy-type adhesives and, therefore, those adhesives should be avoided. As shown in the drawing, the cover plate is mounted preferably by electronic sound welding. With the cover plate mounted in position as described, the passage and chamber are sealed in fluid-tight relation within the metering device.

The cover plate mounts a discharge coupling 50, having an internal passage 51, communicating with the discharge end 39 of the passage 37. An inlet coupling 52, having an internal passage 53, is mounted on a cover plate remote from the discharge coupling and communicating with the inlet end 41 of the chamber 40. A suitable scale 54 is displayed on the front face 46 of the cover plate. The type of scale employed is dependent upon the use to which the metering device 10 is to be directed. In the case of the use shown in FIG. 1, a scale composed of a plurality of substantially parallel longitudinal lines 55 extending between the opposite edges 36 and in substantially right-angular relation to the parallel sections 38 of the passage 37 are preferable. Suitable indicia may be employed to indicate time increments on the scale. However, in the environment shown in FIG. 1, it has been found that operative variations in the time of fuel consumption for a given engine varies and therefore the operator can most effectively simply mark the position on a given line to indicate a desired time increment after experimentation with the engine 12.

As shown in the drawing, a fluid, in this case fuel, is indicated at 60 received within the passage 37. When the fuel is received in the passage, a fluid image 61 is visible through the cover plate 45. Where the cover plate is constructed of Delrin, the plate appears to be opaque until fluid is received within the passage at which time the fluid image becomes visible, as shown in FIG. 1. The width of the passage, as previously described, is sufficiently narrow to cause the fuel to form a coherent mass by capillary attraction thereby forming a terminal end 62 therein remote from the discharge end 39 of the passage.

OPERATION

The operation of the described embodiment of the subject invention is believed to be clearly apparent and is briefly summarized at this point. The metering device 10 is installed on the model aircraft fuselage 11 by simply individually inserting the screws 14 through the screw holes 27 of the mounting flanges 26 and securing them in the fuselage. The fuel line 13 is then extended from the engine 12 and connected to the metering device by receipt about the discharge coupling 50 of the cover plate 45, as shown in FIG. 1. Fluid 60, in this case fuel for the engine 12, is then inserted in the conventional manner through the inlet coupling 52 and into the chamber 40 and passage 37. The fluid is inserted until the entire fuel line, passage and chamber are filled.

As previously noted, in the case of model aircraft operation, experimentation with the use of the specific engine 12 involved allows the operator to determine precisely the length of running time of the engine on a given amount of fuel as represented by the position of the terminal end 62 of the fluid image 61 with respect to a given longitudinal line 55 of the scale 54. The operator can then mark the intersection of the passage and the line at the selected position to indicate the point to be reached by the terminal end of the image for the selected running time of the engine for future reference. The chamber 40 and additional passage area between the chamber and the marked point on the scale provide an extra quantity of fuel to allow the operator to warm up the engine, select the optimum engine adjustments and set up the model aircraft for release upon the terminal end 62 reaching the selected, marked position.

The previously discussed dimensions of the passage 37 and the fact that the passage and chamber 40 are completely filled with fuel 60, insure that consumption of the fuel by the engine 12 initiates movement of the fuel through the passage and chamber as a mass by capillary attraction thereby preventing gaps or air pockets from developing in the passage which would terminate operation of the engine. Expressed differently, the consumption of fuel by the engine causes a pressure reduction in the fuel line at the engine. Thus, atmospheric pressure at the terminal end generates movement of the fuel as a mass toward the engine. Once the terminal end 62 within the passage reaches the marked point, the operator simply releases the aircraft to fly as he has previously adjusted it. Engine operation will, of course, terminate when the terminal end reaches and is consumed by the engine.

It will be obvious that the metering device 10 of the present invention is adaptable for use in a wide variety of areas of application wherein the metering of minute quantities of fluid is required.

Therefore, the metering device of the present invention permits the dependably precise metering of minute quantities of fluid without being dependent upon gravity, external pressure, or mechanical operation as the motivating force and which is of extremely compact size and light weight providing an ease and dependability of operation in a variety of areas of application not heretofore achieved by prior art devices.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A metering device comprising a housing having an elongated reservoir, with a metering end, for fluid to be metered, dimensioned to retain said fluid in an elongated coherent mass having a terminal end remote from said metering end wherein said reservoir has a transverse dimension which is sufficiently small to generate movement of said coherent mass by capillary attraction therethrough during metering and wherein the elongated reservoir is successively return bent in the housing to extend in substantially parallel sections to provide a compact device; and means mounted on said housing in covering relation to the reservoir for making visible said fluid within the reservoir and for displaying reference means against which said terminal end of the fluid can be read to indicate the time required to meter said fluid and said parallel sections of the reservoir are substantially right-angularly related to said reference means to facilitate the reading of said terminal end of the fluid against the reference means.

2. A metering device adapted for connection to a fluid consuming means, the device comprising a housing having a successively return bent passage therein of substantially constant width having a discharge end and being sufficiently narrow to generate fluid movement by capillary attraction upon the initiation of fluid movement from said discharge end; a transparent plate mounted on the housing in fluid-tight covering relation to said passage, and a coupling borne by the plate in communication with the discharge end of the passage for connection to the fluid consuming means to initiate said fluid movement from the discharge end.

3. The device of claim 2 wherein said capillary attraction retains the fluid in said passage as a unitary mass during movement through the discharge end thereof so as to form a terminal end for the fluid remote from said discharge end and the plate is sufficiently transparent to reveal said terminal end to indicate the time required for the terminal end to be consumed by the fluid consuming means.

4. The device of claim 3 wherein the plate displays a scale against which said terminal end is read to indicate the time required for fluid consumption.

5. The device of claim 4 wherein the housing has a fluid receiving chamber therein communicating with the passage remote from the discharge end and dimensioned to provide an additional quantity of fluid for consumption prior to the formation of said terminal end within the passage.

6. The device of claim 5 wherein the fluid consuming means is a model engine and the fluid is fuel consumed by said engine whereby the housing serves as both a fuel tank and a timer for a selected interval of engine operation.

7. The device of claim 4 wherein the return bent passage extends through the housing in substantially parallel sections and the scale displayed by the plate has a plurality of substantially parallel lines of reference disposed in substantially right-angular relation to said sections of the passage for precise reading of the scale relative to said terminal end.

* * * * *